US008484670B2

(12) United States Patent
Klein et al.

(10) Patent No.: US 8,484,670 B2
(45) Date of Patent: Jul. 9, 2013

(54) METHOD AND APPARATUS FOR DISTRIBUTING PROMOTIONAL MATERIALS

(75) Inventors: Reuben Klein, East Brunswick, NJ (US); Sreenivasa Gorti, Austin, TX (US); Karen Mullis, Loganville, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 133 days.

(21) Appl. No.: 13/159,690

(22) Filed: Jun. 14, 2011

(65) Prior Publication Data

US 2012/0324501 A1 Dec. 20, 2012

(51) Int. Cl.
*H04N 7/16* (2011.01)
(52) U.S. Cl.
USPC ........... 725/23; 725/32; 725/34; 725/42; 725/91; 725/100; 725/114; 725/131; 725/138; 725/139
(58) Field of Classification Search
USPC ............ 725/23, 32, 34, 91, 100, 114, 42, 725/131, 138–139; 705/14.1
See application file for complete search history.

(56) References Cited

U.S. PATENT DOCUMENTS

| | | | |
|---|---|---|---|
| 5,855,007 A | 12/1998 | Jovicic | |
| 6,057,872 A | 5/2000 | Candelore | |
| 6,497,360 B1 | 12/2002 | Schulze, Jr. | |
| 7,244,180 B2 * | 7/2007 | McHugh | 463/40 |
| 7,302,696 B1 * | 11/2007 | Yamamoto | 725/23 |
| 8,065,186 B2 * | 11/2011 | Broumand | 705/14.69 |
| 2002/0038455 A1 * | 3/2002 | Srinivasan et al. | 725/35 |
| 2007/0174116 A1 * | 7/2007 | Keith et al. | 705/14 |
| 2008/0016142 A1 * | 1/2008 | Schneider | 709/203 |
| 2009/0259535 A1 | 10/2009 | Chow | |
| 2009/0307067 A1 | 12/2009 | Obermeyer | |
| 2010/0325666 A1 * | 12/2010 | Wiser et al. | 725/44 |
| 2011/0161142 A1 * | 6/2011 | Dunn et al. | 705/14.1 |

OTHER PUBLICATIONS

Bagh, Carl, "How Google Wallet Works?", May 27, 2011, 1OF4.
Bagh, Carl, "With Google Wallet in Hand, Who Needs Groupon Now?", May 27, 2011, 1OF4.

* cited by examiner

*Primary Examiner* — Mulugeta Mengesha
(74) *Attorney, Agent, or Firm* — Guntin & Gust, PLC; Andrew Gust

(57) ABSTRACT

A system that incorporates teachings of the present disclosure may include, for example, a server having a memory coupled to a processor. The processor can be operable to receive a request for promotional information responsive to a media processor detecting a promotional tag in a media program stream and transmit to the media processor promotional information associated with a promotion responsive to a determination that a promotional offer is available. The processor can also be operable to receive from the media processor a request for redeemable material associated with the promotion and store the redeemable material in a portion of a database associated with a user of the media processor. Other embodiments are disclosed.

21 Claims, 13 Drawing Sheets

200

METHOD AND APPARATUS FOR DISTRIBUTING PROMOTIONAL MATERIALS

FIELD OF THE DISCLOSURE

The present disclosure relates generally to a method and apparatus for distributing promotional materials.

BACKGROUND

Retail establishments deliver promotional materials such as coupons to end users over a variety of mechanisms. Such mechanisms can include hardcopy coupons (that may come in a newspaper, or other printed form), debit card (where coupon credits exist on a physical magnetic card), via mobile phone messages, or via web pages on the Internet. End-users can present such coupons to a retail establishment and have the establishment recognize and honor the promotion. Upon presentation of a coupon, the user "gives up" the coupon, and no longer has access to reuse that particular coupon. Normally, such offers have a limited redemption period indicated by an expiration date often printed or encoded as part of the terms and conditions of the promotion. The user can acquire more coupons from the same or additional coupon sources from time to time.

DETAILED DESCRIPTION

The present disclosure describes, among other things, illustrative embodiments for distributing promotional materials. Other embodiments are contemplated by the present disclosure.

One embodiment of the present disclosure includes a method for receiving a television program stream, presenting the television program stream, and detecting a coupon tag in the television program stream. The method further includes retrieving the coupon tag from the television program stream, and transmitting to a remote server a request for coupon information, the request comprising at least a portion of the coupon tag, an identifier of a set-top box, and descriptive information about the television program stream. The method also includes receiving coupon information associated with a coupon without receiving the coupon itself responsive to a determination that a coupon offer is available at approximately a time when the request was transmitted, presenting the coupon information contemporaneously with at least a portion of the television program stream, and transmitting to the remote server a coupon request generated by a remote controller of the set-top box upon receiving the coupon request within a predetermined time. The transmitting of the coupon request can cause the remote server to store the coupon at a remote database associated with a user of the set-top box.

One embodiment of the present disclosure includes a method for receiving a first request for coupon information responsive to a media processor detecting a coupon tag received with a media program stream, and transmitting to the media processor coupon information associated with a coupon without transmitting the coupon itself responsive to a determination that a coupon offer is available at approximately a time when the first request is received, receiving from the media processor a second request to acquire the coupon responsive to an action generated by an input device of the media processor, and storing the coupon in a database associated with a user of the media processor responsive to receiving the second request for the coupon.

One embodiment of the present disclosure includes a server having a memory coupled to a processor. The processor can be operable to receive a request for promotional information responsive to a media processor detecting a promotional tag in a media program stream, and transmit to the media processor promotional information associated with a promotion item responsive to a determination that a promotional offer is available. The processor can also be operable to receive from the media processor a request for redeemable material associated with the promotion item, and store the redeemable material in a portion of a database associated with a user of the media processor.

Figure 1:
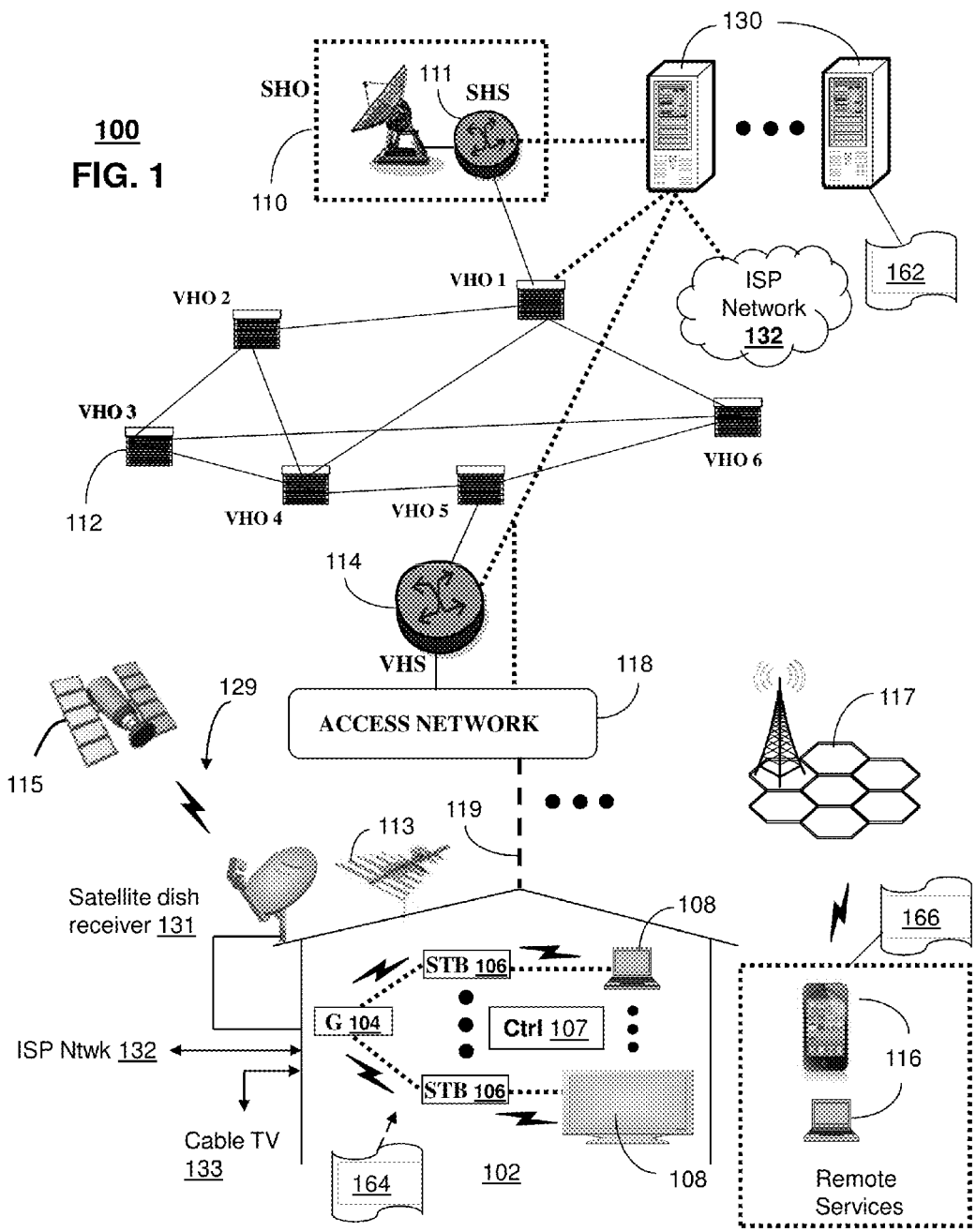
FIGS. 1-2 depict illustrative embodiments of communication systems that provide media services.

FIG. 1 depicts an illustrative embodiment of a first communication system 100 for delivering media content. The communication system 100 can represent an Internet Protocol Television (IPTV) media system. The IPTV media system can include a super head-end office (SHO) 110 with at least one super headend office server (SHS) 111 which receives media content from satellite and/or terrestrial communication systems. In the present context, media content can represent, for example, audio content, moving image content such as 2D or 3D videos, video games, virtual reality content, still image content, and combinations thereof. The media content can include promotional tags such as coupon tags which can be used to present promotional information to users. The promotional tags can be embedded in the media content or can be delivered in combination with the media content. The SHS server 111 can forward packets associated with the media content to one or more video head-end servers (VHS) 114 via a network of video head-end offices (VHO) 112 according to a common multicast communication protocol.

The VHS 114 can distribute multimedia broadcast content via an access network 118 to commercial and/or residential buildings 102 housing a gateway 104 (such as a residential or commercial gateway). The access network 118 can represent a group of digital subscriber line access multiplexers (DSLAMs) located in a central office or a service area interface that provide broadband services over fiber optical links or copper twisted pairs 119 to buildings 102. The gateway 104 can use common communication technology to distribute broadcast signals to media processors 106 such as Set-Top Boxes (STBs) which in turn present broadcast channels to media devices 108 such as computers or television sets managed in some instances by a media controller 107 (such as an infrared or RF remote controller). The STBs 106 can be adapted to present promotional materials which can be selected with the media controller 107 and stored in a remote location.

The gateway 104, the media processors 106, and media devices 108 can utilize tethered communication technologies (such as coaxial, powerline or phone line wiring) or can operate over a wireless access protocol such as WiFi (e.g., IEEE 802.11b, g, n), Bluetooth, Zigbee, or other present or next generation local or personal area wireless network technologies. By way of these interfaces, unicast communications can also be invoked between the media processors 106 and subsystems of the IPTV media system for services such as video-on-demand (VoD), browsing an electronic programming guide (EPG), or other infrastructure services.

A satellite broadcast television system 129 can be used also in the media system of FIG. 1. The satellite broadcast television system can be overlaid, operably coupled with, or replace the IPTV system as another representative embodiment of communication system 100. In this embodiment, signals transmitted by a satellite 115 carrying media content can be received by a satellite dish receiver 131 coupled to the building 102. Modulated signals received by the satellite dish receiver 131 can be transferred to the media processors 106 for demodulating, decoding, encoding, and/or distributing broadcast channels to the media devices 108. The media processors 106 can be equipped with a broadband port to the ISP network 132 to enable interactive services such as VoD and EPG as described above.

In yet another embodiment, an RF broadcast distribution system 113 or digital cable broadcast distribution system such as cable TV system 133 can be overlaid, operably coupled with, or replace the IPTV system and/or the satellite TV system as another representative embodiment of communication system 100. In this embodiment, the cable TV system 133 can also provide Internet, telephony, and interactive media services.

It is contemplated that the present disclosure can apply to other present or next generation over-the-air and/or landline media content services system.

Some of the network elements of the IPTV media system can be coupled to one or more computing devices 130, a portion of which can operate as a web server for providing web portal services over an Internet Service Provider (ISP) network 132 to wireline media devices 108 or wireless communication devices 116. Communication system 100 can also provide for all or a portion of the computing devices 130 to function as a promotional server (herein referred to as promotional server 130). The promotional server 130 can use common computing and communication technology to perform function 162, which can include among other things, delivering promotional information to media processors 106 and other devices, processing requests for promotional information from media processors 106 and other devices, storing promotional materials selected by the media processors 106 or other devices, making promotional materials accessible to multiple communication devices such as references 108 and 116, and tracking and redeeming of promotional materials processed by retailers. The media processors 106 and wireless communication devices 116 can be adapted with software functions 164 and 166, respectively, to utilize the services of the promotional server 130.

In the present context, promotional materials can mean, for example, coupons as well as other forms of collateral materials that can have commercial value to consumers during the purchase of goods or services. It is further noted that the promotional server 130 can also represent a system of servers or other forms of computing resources that can be located in disparate locations, each performing portions of function 162.

It is further noted that multiple forms of media services can be offered to media devices over landline technologies such as those described above. Additionally, media services can be offered to media devices by way of a wireless access base station 117 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, DVB-H, DVB-CBMS and so on. Other present and next generation wide area wireless network technologies are contemplated by the present disclosure.

Figure 2:
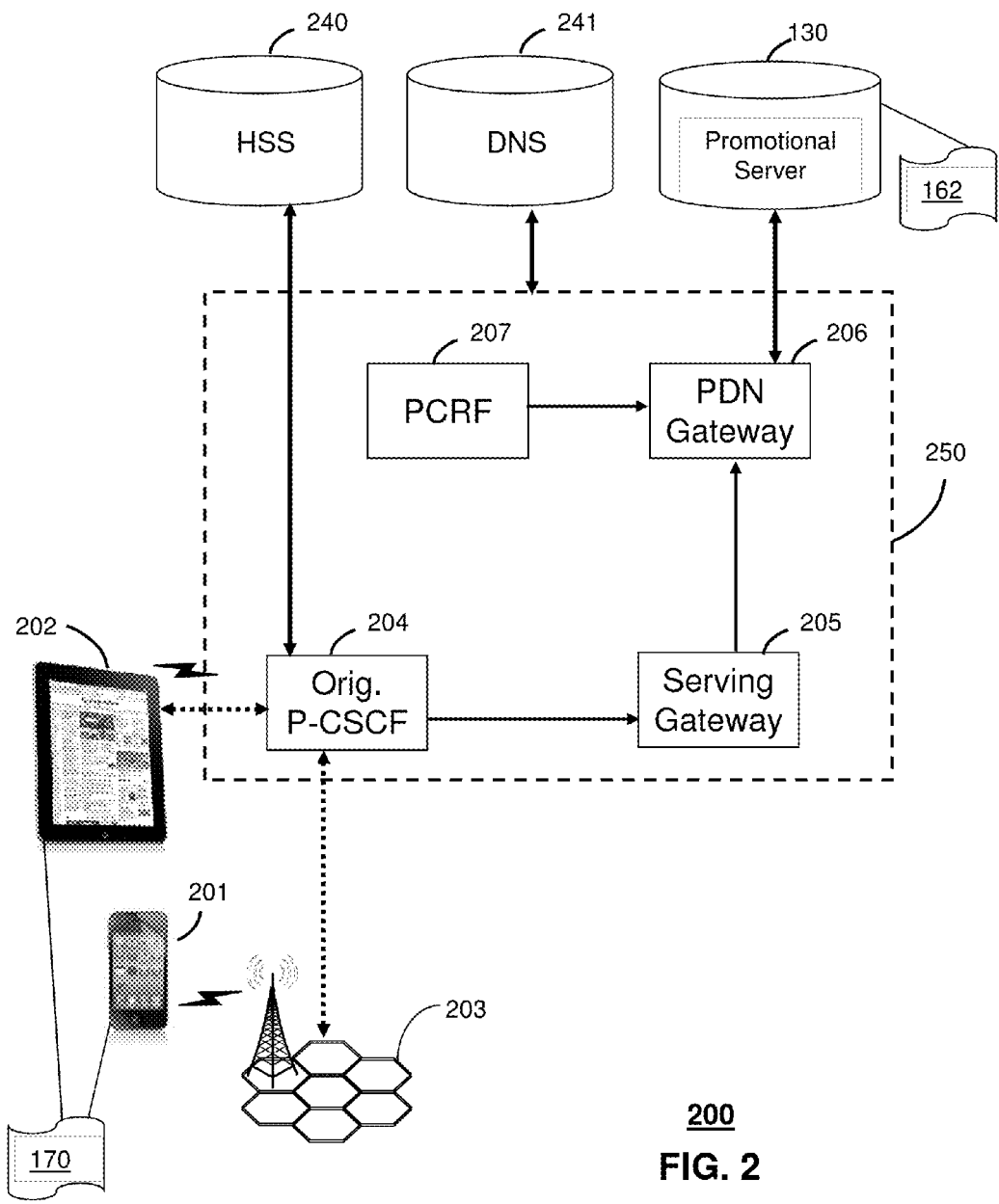

FIG. 2 depicts an illustrative embodiment of a communication system 200 employing an IP Multimedia Subsystem (IMS) network architecture to facilitate the combined services of circuit-switched and packet-switched systems. Communication system 200 can be overlaid or operably coupled with communication system 100 as another representative embodiment of communication system 100.

Communication system 200 can comprise a Home Subscriber Server (HSS) 240, and other common network elements of an IMS network 250. The IMS network 250 can establish communications between IMS-compliant communication devices (CDs) 201, and 202 and external computing services, such as server 130 accessible on an external packet data network.

IMS CDs 201, 202 can register with the IMS network 250 by contacting a Proxy Call Session Control Function (P-CSCF) which communicates with the HSS 240 in order to register the CD. To initiate a communication session between an originating IMS CD 201 and the Promotional Server 130, the CD can submit an HTTP request message to an originating P-CSCF 204 which communicates with a corresponding Serving Gateway 205.

The Serving Gateway 205 can submit queries to the HSS 240 to find the subscriber profile associated with the CD. Once authorized, the Serving Gateway 205 can communicate with an appropriate Packet Data Network (PDN) Gateway 206 to route the HTTP request to its destination. The PDN Gateway, in turn, queries the Policy and Charging Rules Function (PCRF) in order to determine if the HTTP request is valid, chargeable to the subscriber and does not exceed the authorized usage maximum established for the subscriber.

Additionally, the PDN Gateway 206 will reference the Domain Name Service (DNS) 241 to acquire the IP address of the requested server 130 and routes the request to the external server.

In addition, communication system 200 can be adapted to provide the IMS CDs 201, 202 with the multimedia and Internet services of communication system 100 of FIG. 1.

It is further appreciated that the CDs of FIG. 2 can operate as wireline or wireless devices. For example, the CDs of FIG. 2 can be communicatively coupled to a cellular base station 203, a femtocell, a WiFi router, a DECT base unit, or another suitable wireless access unit to establish communications with the IMS network 250 of FIG. 2. The cellular access base station 203 can operate according to common wireless access protocols such as Global System for Mobile (GSM), Code Division Multiple Access (CDMA), Time Division Multiple Access (TDMA), Universal Mobile Telecommunications (UMTS), World interoperability for Microwave (WiMAX), Software Defined Radio (SDR), Long Term Evolution (LTE), and so on. Other present and next generation wireless network technologies are contemplated by the present disclosure. Accordingly, multiple wireline and wireless communication technologies are contemplated for the CDs of FIG. 2.

The promotional server 130 of FIG. 2 can be operably coupled to the second communication system 200 for purposes similar to those described above. It is further contemplated by the present disclosure that promotional server 130 can perform function 162 and thereby provide promotional services to the CDs 201, and 202, of FIG. 2. CDs 201, and 202, which can be adapted with software to perform function 170 to utilize the services of the promotional server 130.

Figure 3:
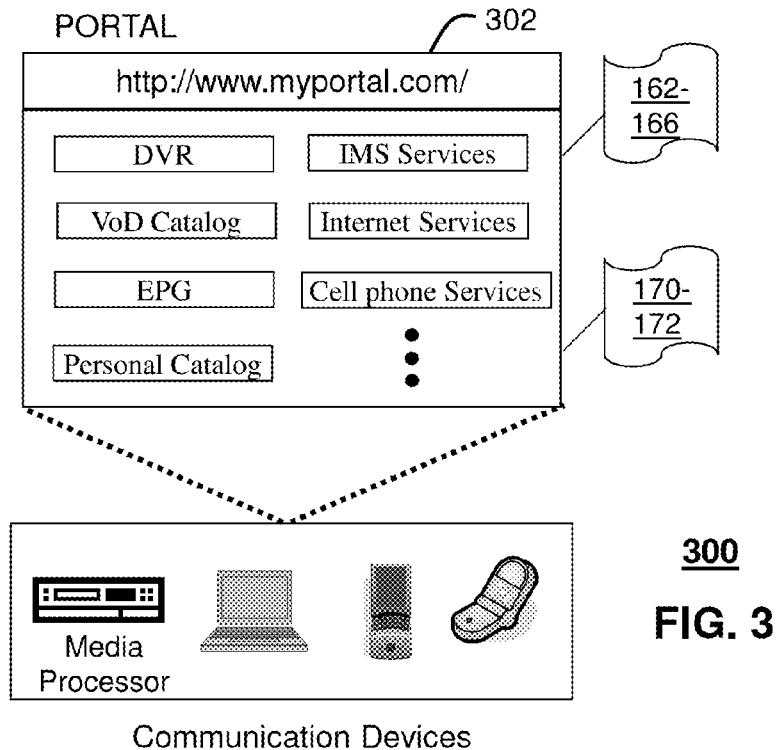
FIG. 3 depicts an illustrative embodiment of a web portal for interacting with the communication systems of FIGS. 1-2.

FIG. 3 depicts an illustrative embodiment of a web portal 302 which can be hosted by server applications operating from the computing devices 130 of the communication system 100 illustrated in FIG. 1. The web portal 302 can be used for managing services of communication systems 100-200. A web page of the web portal 302 can be accessed by a Uniform Resource Locator (URL) with an Internet browser such as Microsoft's Internet Explorer™, Mozilla's Firefox™, Apple's Safari™, or Google's Chrome™ using an Internet-capable communication device such as those described in FIGS. 1-2. The web portal 302 can be configured, for example, to access a media processor 106 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 106. The web portal 302 can also be used for provisioning IMS services described earlier, provisioning Internet services, provisioning cellular phone services, and so on.

It is contemplated by the present disclosure that the web portal 302 can further be utilized to manage and provision software applications 162, 164, 166, 170, and 172 to adapt these applications as may be desired by subscribers and service providers of communication systems 100-200.

Figure 4:
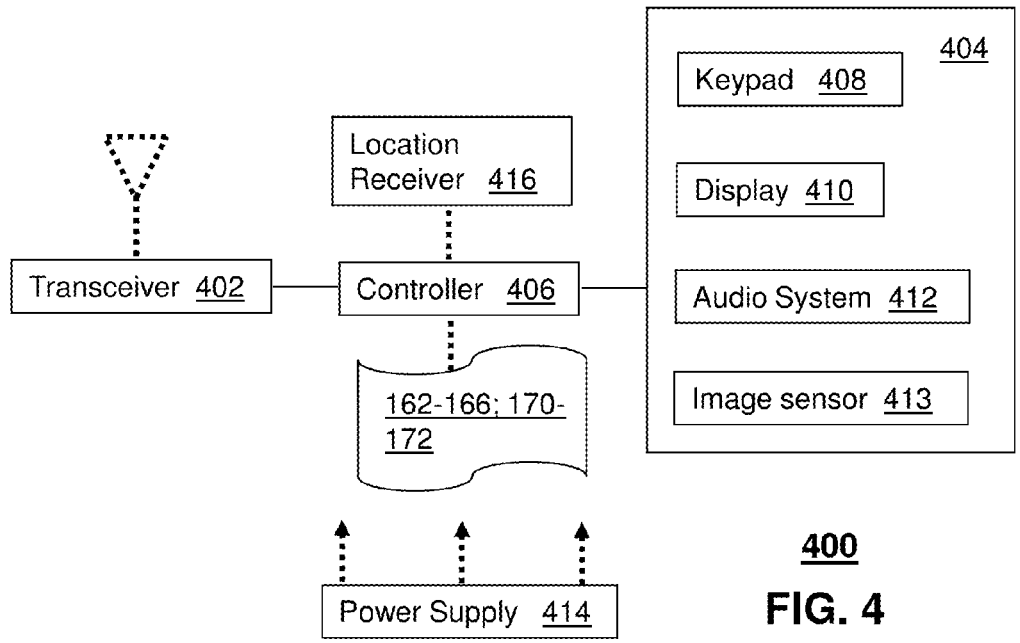
FIG. 4 depicts an illustrative embodiment of a communication device utilized in the communication systems of FIGS. 1-2.

FIG. 4 depicts an exemplary embodiment of a communication device 400. Communication device 400 can serve in whole or in part as an illustrative embodiment of the devices depicted in FIGS. 1-2. The communication device 400 can comprise a wireline and/or wireless transceiver 402 (herein transceiver 402), a user interface (UI) 404, a power supply 414, a location receiver 416, and a controller 406 for managing operations thereof. The transceiver 402 can support short-range or long-range wireless access technologies such as Bluetooth, WiFi, Digital Enhanced Cordless Telecommunications (DECT), or cellular communication technologies, just to mention a few. Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 402 can also be adapted to support circuit-switched wireline access technologies (such as PSTN), packet-switched wireline access technologies (such as TCP/IP, VoIP, etc.), and combinations thereof.

The UI 404 can include a depressible or touch-sensitive keypad 408 with a navigation mechanism such as a roller ball, a joystick, a mouse, or a navigation disk for manipulating operations of the communication device 400. The keypad 408 can be an integral part of a housing assembly of the communication device 400 or an independent device operably coupled thereto by a tethered wireline interface (such as a USB cable) or a wireless interface supporting for example Bluetooth. The keypad 408 can represent a numeric keypad commonly used by phones, and/or a QWERTY keypad with alphanumeric keys. The UI 404 can further include a display 410 such as monochrome or color LCD (Liquid Crystal Display), OLED (Organic Light Emitting Diode) or other suitable display technology for conveying images to an end user of the communication device 400. In an embodiment where the display 410 is touch-sensitive, a portion or all of the keypad 408 can be presented by way of the display 410 with navigation features.

The UI 404 can also include an audio system 412 that utilizes common audio technology for conveying low volume audio (such as audio heard only in the proximity of a human ear) and high volume audio (such as speakerphone for hands free operation). The audio system 412 can further include a microphone for receiving audible signals of an end user. The audio system 412 can also be used for voice recognition applications. The UI 404 can further include an image sensor 413 such as a charged coupled device (CCD) camera for capturing still or moving images.

The power supply 414 can utilize common power management technologies such as replaceable and rechargeable batteries, supply regulation technologies, and charging system technologies for supplying energy to the components of the communication device 400 to facilitate long-range or short-range portable applications. The location receiver 416 can utilize common location technology such as a global positioning system (GPS) receiver capable of assisted GPS for identifying a location of the communication device 400 based on signals generated by a constellation of GPS satellites, thereby facilitating common location services such as navigation.

The communication device 400 can use the transceiver 402 to also determine a proximity to a cellular, WiFi, Bluetooth, or other wireless access points by common sensing techniques such as utilizing a received signal strength indicator (RSSI) and/or a signal time of arrival (TOA) or time of flight (TOF). The controller 406 can utilize computing technologies such as a microprocessor, a digital signal processor (DSP), and/or a video processor with associated storage memory such as Flash, ROM, RAM, SRAM, DRAM or other storage technologies.

The communication device 400 can be adapted to perform the functions of the media processor 106, the media devices 108, or the portable communication devices 116 of FIG. 1, as well as the IMS CDs 201-202 and PSTN CDs 203-205 of FIG. 2. It will be appreciated that the communication device 400 can also represent other common devices that can operate in communication systems 100-200 of FIGS. 1-2 such as a gaming console and a media player.

It is contemplated by the present disclosure that the communication device 400 shown in FIG. 4 or portions thereof can serve as a representation of one or more of the devices of communication systems 100-200. It is further contemplated that the controller 406 can be adapted in various embodiments to perform the functions 162-166 and 170-172, respectively.

Figure 5:
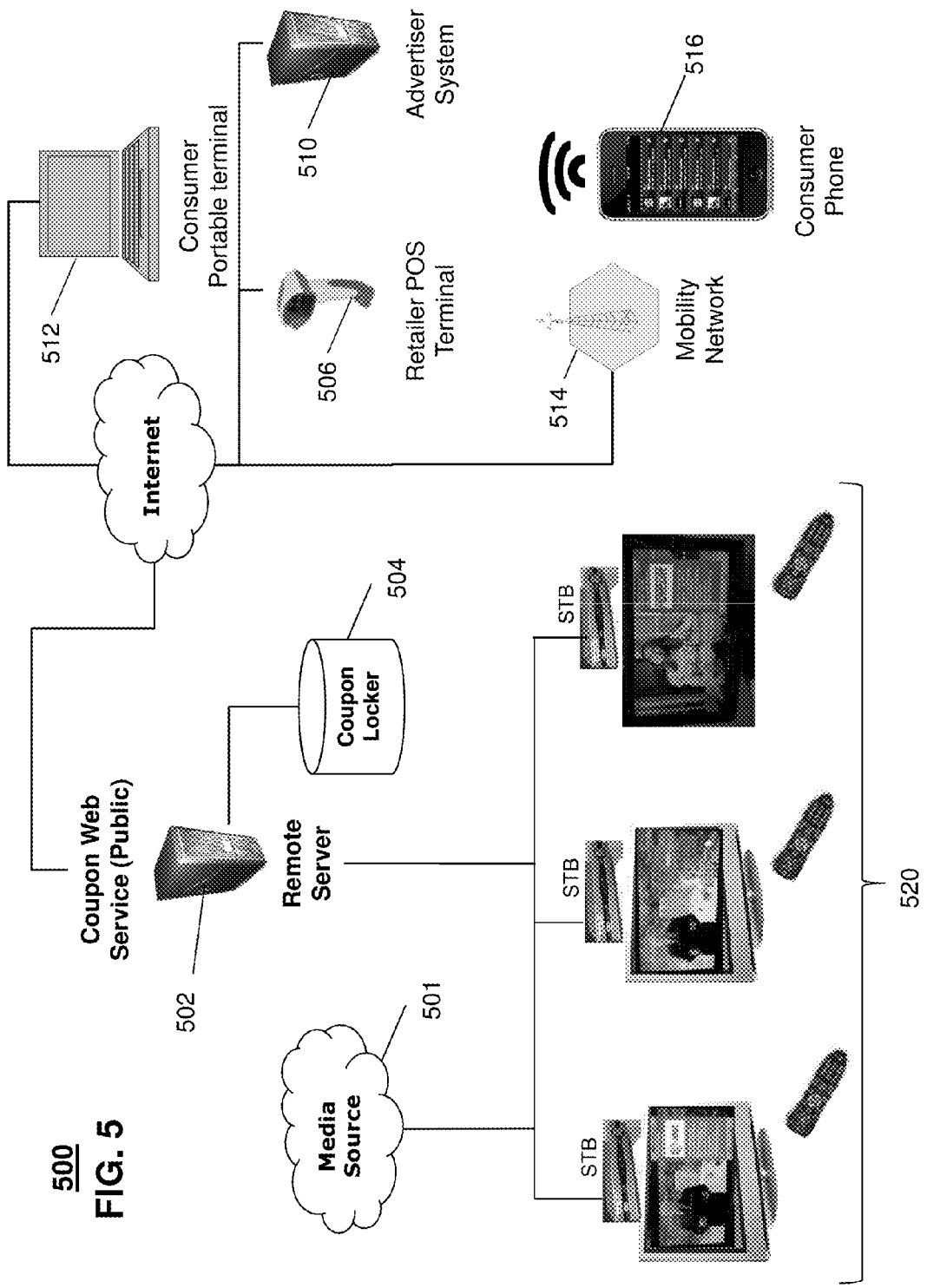
FIG. 5 depicts an illustrative embodiment of a system for distributing and processing promotional materials.

FIG. 5 depicts an illustrative embodiment of a system 500 for distributing and processing promotional materials. System 500 can be overlaid or operably coupled to communication systems 100-200 as another representative embodiment of communication systems 100-200. System 500 can comprise a remote server 502 with a database 504 that can be classified for illustration purposes only as a coupon locker for subscribers of STBs 520, users of computing devices 512 (such as a laptop computer, tablet, etc.), and users of mobile devices 516 (such as mobile phones, smart phones, etc.). The STBs 520 can receive media content from a media source 501. The media source 501 can represent at least one of communication systems 100-200 in whole or in part. The mobile devices 516 can be communicatively coupled to the remote server 502 by way of a mobility network 514 coupled to the Internet or other communication means. The computing devices 512, advertising systems 510, and point of sale (POS) terminals 506 can also be communicatively coupled to the remote server 502 by way of the Internet or other communication means. The operation of system 500 can be described by the illustrative embodiments of method 600 of FIG. 6.

Figure 6:
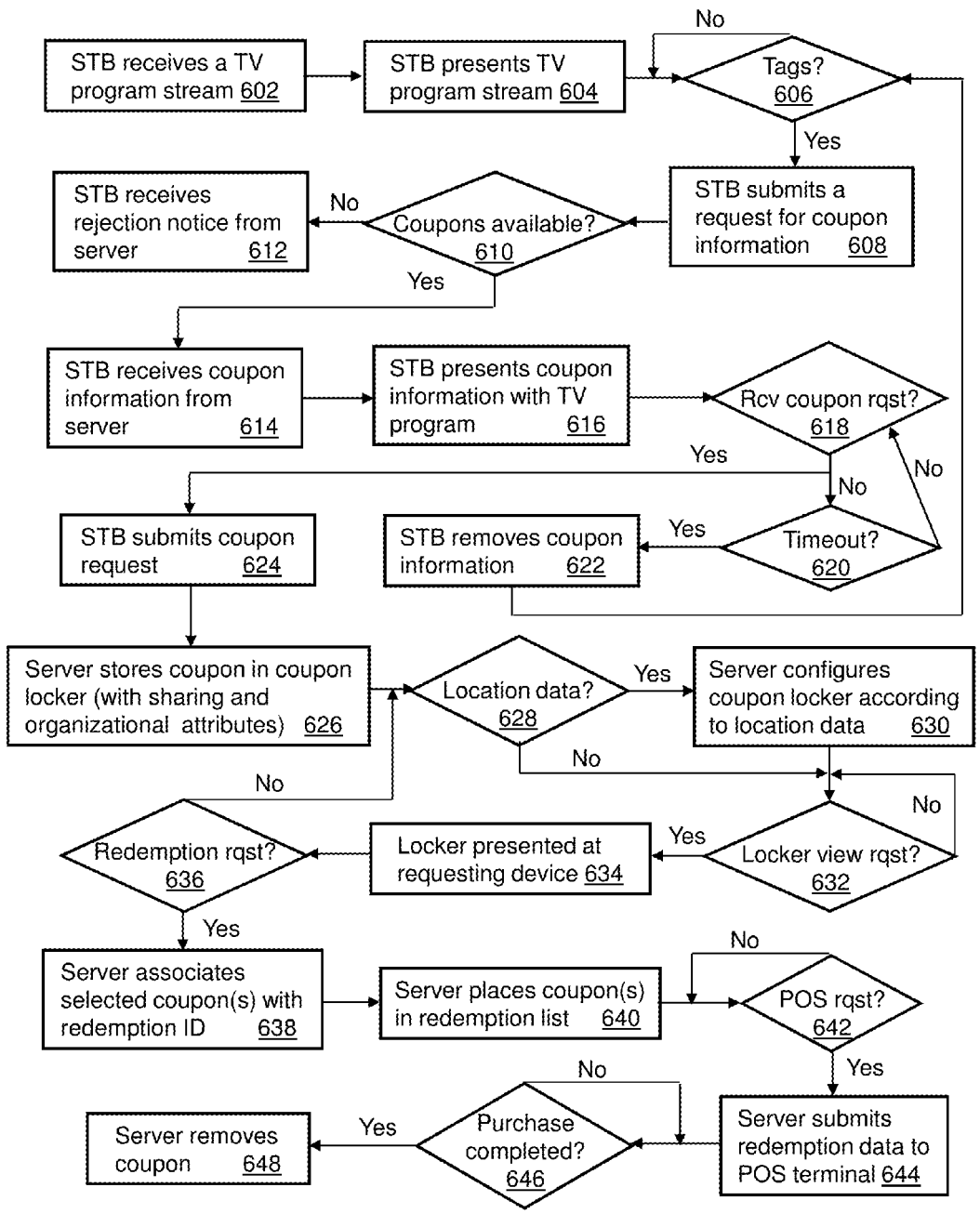
FIG. 6 depicts an illustrative embodiment of a method operating in portions of the systems described in FIGS. 1-5.

FIG. 6 depicts an illustrative method 600 that operates in portions of the devices of FIGS. 1-5. Method 600 can begin with step 602 in which an STB 520 receives a TV program stream from the media source 501 (e.g., VHS 114 of FIG. 1). The STB 520 can be adapted to present the TV program stream in step 604 at a media device such as a television set. In step 606, the STB 520 can be adapted to monitor promotional tags delivered with the TV program stream. The promotional tags can be embedded in the TV program stream, in metadata, closed caption data, or can be delivered by other suitable means. The promotion tags can also represent metadata associated with the TV program stream or markers added to the TV program stream. The promotion tags for illustration purposes can represent a coupon tag that can mark a point in the TV program where it would be appropriate to present to a subscriber a promotional offer in the form of, for example, a coupon. If a coupon tag is detected in step 606, the STB proceeds to step 608 where it submits to the remote server 502 a request for coupon information associated with the coupon tag. The coupon request can include among other things the coupon tag in whole or in part, a television program identifier (ID) (or asset ID) that was transmitted to the STB 520 with the TV program that would enable the remote server 502 to promptly look up descriptions about the TV program in for example a look-up table, an identifier of the STB 520 (such as a globally unique identifier (GUID), a media access control address (MAC), etc.), descriptive information about the TV program, and/or descriptive information of a subscriber of the STB 520.

The descriptive information can be a scheduled presentation date of the TV program, a title of the TV program, an indicator of how much time has expired since the TV program presentation started, and so on. The remote server 502 can utilize the information provided in the request to determine if a coupon is available at the time the request is submitted. The descriptive information about the TV program can also be used by the remote server 502 to determine if the TV program is being presented at an expected presentation schedule, or if the TV program is being presented from a prior recording taken by a DVR feature of the STB 520. For example, if the request is received by the remote server 502 at a time outside of the presentation schedule of the TV program, then the remote server 502 can assume the TV program is being played from a DVR recording.

If the remote server 502 determines that the TV program is being presented during a scheduled showing, the remote server 502 can be adapted to choose in step 610 one type of promotional coupon offering, while if the TV program is being presented from a prior DVR recording the remote server 502 can offer another type of promotional coupon or none at all. The remote server 502 can also retrieve a prior history of coupons requested by the subscriber of the STB 520, which can indicate a particular behavioral pattern and interest. The remote server 502 can further retrieve subscription information of the subscriber such as age, gender, occupation, subscriptions, and other forms of identifiable information of the subscriber to generate a demographic and/or psychographic profile which can be used to identify particular interests and biases of the subscriber. The behavioral patterns of prior coupon selections and/or the demographic and/or psychographic profile of the subscriber can also be used by the remote server 502 to select promotional material.

In yet another embodiment, the remote server 502 can be adapted to perform preprocessing of any one of the aforementioned factors which may be descriptive of a subscriber of the STB 520. The remote server 502 can, for example, create a consumption identifier (ID) which can be associated with the user of the STB 520. For instance, the remote server 502 may determine from a subscriber account that the subscriber resides in Dallas, Tex., and thereby create a location identifier (e.g., 300). The remote server 502 may further ascertain demographic information about the subscriber such as gender, age, etc., and can thereby generate a demographic identifier (e.g., 50) to represent these characteristics of the subscriber. The remote server 502 may further ascertain that the subscriber is a high user of promotion materials, and thereby generate a usage identifier (e.g., 9 for high usage 1 for low usage). The remote server 502 can be further adapted to combine these identifiers into an aggregate identifier (e.g., 359=300+50+9) representing a consumption ID of the subscriber, which the remote server 502 can then associate with the GUID of the STB 520.

Accordingly, when the remote server 502 receives a request for promotional materials from the STB 520 supplying a GUID to identify itself, the remote server 502 can promptly retrieve the consumption ID associated with the GUID and assess a consumer profile of the requesting subscriber without having to analyze the subscriber's account information or other sources of descriptive data of the subscriber. The consumption ID can then be used by the remote server 502 to select promotional materials that more accurately targets the interests of the subscriber.

Figure 7:
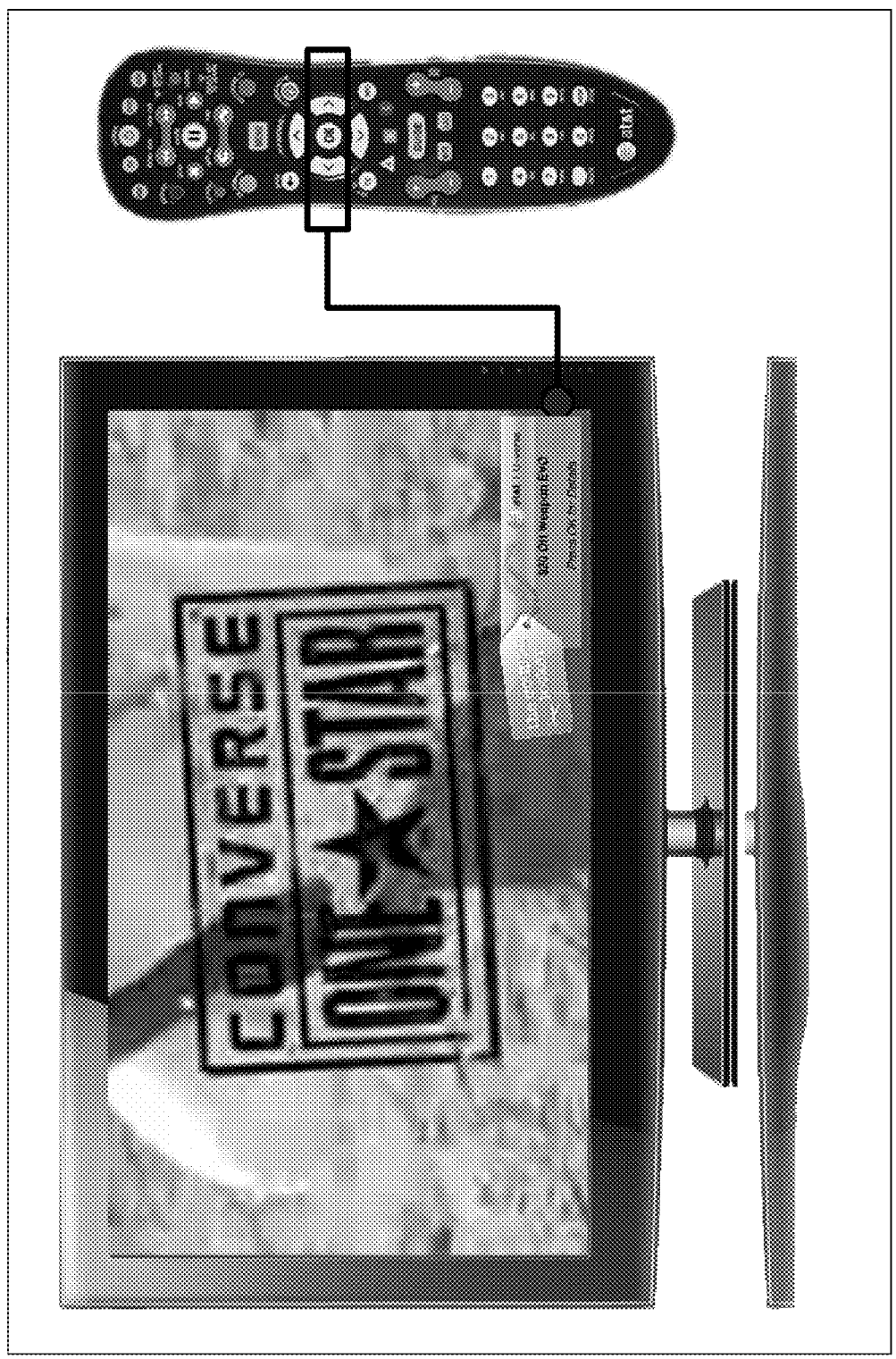
FIGS. 7-13 depict illustrative embodiments of the method of FIG. 6.

If the remote server 502 determines there are no available coupons at the time the request is received, then in step 612 the STB 520 can receive from the remote server 502 a rejection notice. In this step, the STB 520 can ignore the coupon tag and continue to monitor additional coupon tags in step 606 while presenting only the TV program at the TV set. Thus, when a coupon tag does not render promotional material(s) from the remote server 502, the subscriber would not be aware that the STB 520 attempted to acquire coupon information. If, on the other hand, a coupon is found by the remote server 502 in step 610, then the STB 520 receives at step 614 from the remote server 502 coupon information related to the coupon without receiving the coupon itself. Since the subscriber has not chosen the coupon, it is more efficient to send descriptive information about the coupon rather than the coupon itself. At step 616, the STB 520 can be adapted to present the coupon information contemporaneously with the TV program—see FIG. 7 for an illustration of this step.

At step 618, the STB 520 can be adapted to monitor whether the subscriber has made a request for the coupon depicted in step 616. A coupon request can be generated by depressing the "OK" button on the remote controller as instructed by the presentation describing the coupon—see FIG. 7. If a request is not generated, the STB 520 proceeds to step 620 where it determines if the presentation of the coupon has exceeding a presentation period (e.g., 20 seconds). If presentation period has expired, then the STB 520 proceeds to step 622 where it removes the presentation of the coupon information superimposed on the TV program. The STB 520 then returns to step 606 where it continues to monitor coupon tags.

If, on the other hand, the presentation period has not expired, then the STB 520 returns to step 618 to continue monitoring for a coupon request. If a coupon request is generated by the remote controller and received by the STB 520 in step 618 before the presentation period has expired, then the STB 520 proceeds to step 624 where it submits the coupon request or a derivative thereof to the remote server 502. The remote server 502 can then transmit policy information associated with the desired coupon to the STB 520, which the STB 520 can present to the user. The policy information can outline the terms and conditions to use the coupon, an expiration date of the promotion, or other suitable information for describing the use limitations of the coupon. The user can then select with a remote controller "Accept" or "Decline" buttons to accept or reject the coupon's policy. If the user selects the Accept button, then in step 626 the remote server 502 can prepare an electronic copy of the coupon for storage in a portion of the coupon locker 504 that is assigned to the subscriber of the STB 520.

Figure 8:
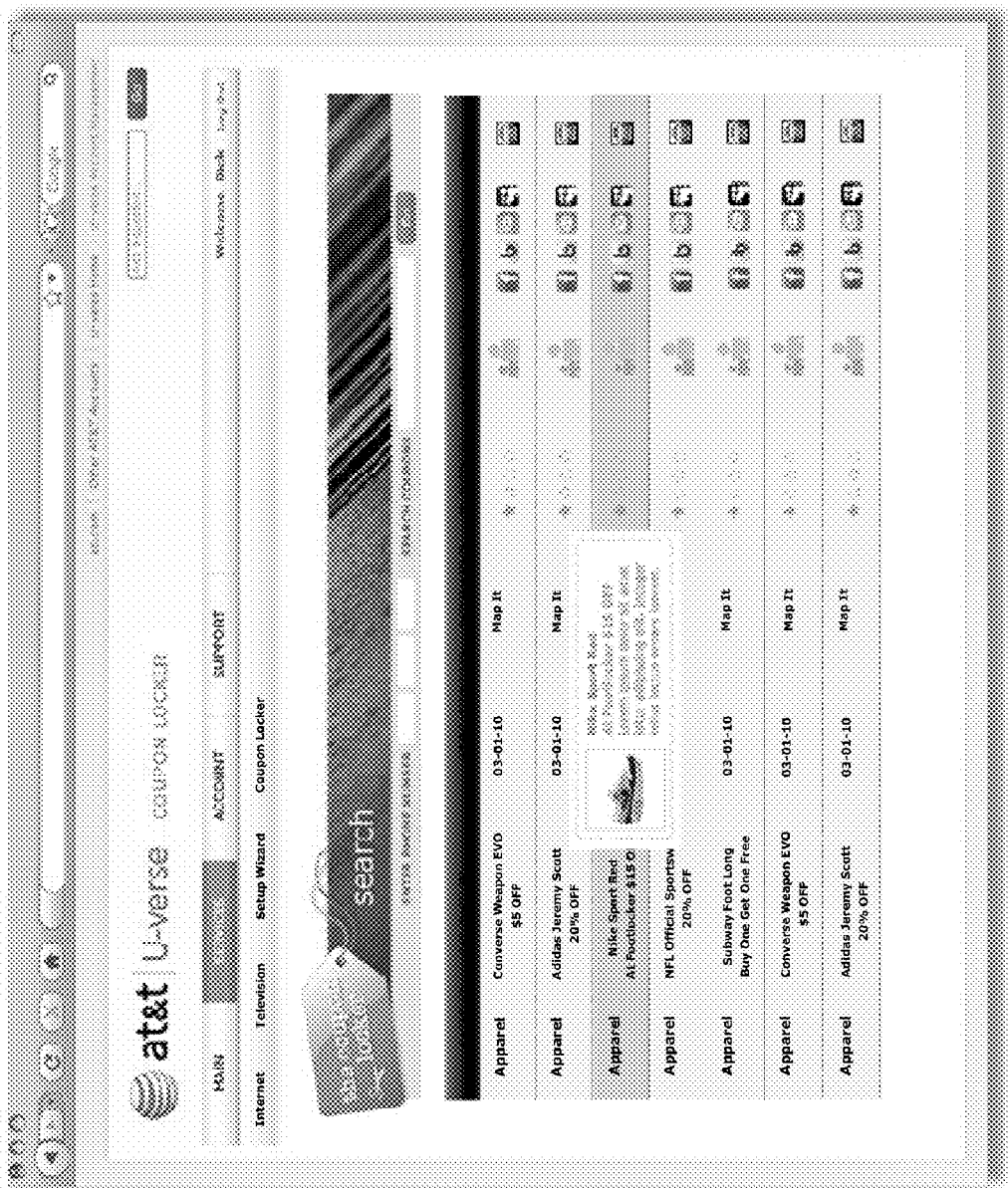

The coupon (and prior coupons) stored in the coupon locker 504 can be accessed by the subscriber from the STB 520 or any browser-enabled device of the subscriber such as the computing device 512 or mobile device 516—see FIG. 8 for an illustration. At the time the request for the coupon is generated, a GUI can be presented on the TV set with options to associate attributes with the stored coupon. The subscriber can also remotely access the coupon locker 504 at a later time by way of a portal interface such as described in FIG. 3 to associate attributes with the stored coupon.

The attributes provisioned by the subscriber can enable the subscriber to share the coupon just selected in step 618 (as well as other coupons in the coupon locker 504) with friends and family across multiple devices of the parties identified. Once a sharing attribute is established (e.g., providing contact information such as email addresses of friends and family), friends and family can be provided login access to the portion of the coupon locker 504 of the subscriber, which can be accessed by one or more devices of the friends and family (e.g., STB, cell phone, computer, etc.) to utilize coupons which the subscriber has made available to them. The subscriber can also identify ranking attributes for presenting the coupons. For example, the subscriber can identify certain retailers that are preferred over others, certain goods or services that are preferred over others, and so on.

In another embodiment, the subscriber can provision attributes on certain coupons to reserve the coupons for the subscriber's personal use only. That is, only the subscriber would have access to the coupon(s) designated as being reserved. In yet another embodiment, the subscriber can transfer coupons to others. The subscriber can, for example, direct the remote server 502 to transfer one or more coupons to coupon lockers 504 of other parties.

In another embodiment, the subscriber can enable an attribute for location-based services at a local device of the subscriber (e.g., STB, cellular telephone, computer, etc.). For illustration purposes, the local device will be assumed to be the mobile device 516 of FIG. 5. The remote server 502 can, for example, transmit descriptive information from the subscriber's coupon locker 504 to the mobile device 516 for local storage. The descriptive information can include the type of coupon, its value, which retailers are willing to accept the coupon, the location of the retailers, a map associated with the coupon, and so on. The mobile device 516 can be adapted to present a list of coupon items in the subscriber's coupon locker 504 whether or not the mobile device 516 has access to the coupon locker 504—see for example reference 902 of FIG. 9.

With location-services enabled on the mobile device 516, the device can present the coupon items in a manner that is useful to the subscriber according to the location of the subscriber (e.g., determined by way of GPS coordinates). For instance, the mobile device 516 can be adapted to detect that the subscriber is located in a shopping mall, and thereby present a map of retailers who can accept coupons in the subscriber's coupon locker 504—see reference 906 of FIG. 9. In the foregoing embodiment, the remote server 502 can periodically synchronize the local copy of descriptive information of the coupon locker 504 stored in the subscriber's device.

In another embodiment, the subscriber can enable an attribute for location-based services provided by the remote server 502. If location-based services is activated, the remote server 502 can be adapted to receive in step 628 location data (e.g., GPS coordinates) from portable computing devices 512 or mobile devices 516, which the remote server 502 can then use to configure the coupon locker in step 630. The coupons can be configured, for example, by identifying coupons that may be of interest to the subscriber according to the attributes set in step 626, and according to a current location of the subscriber.

Figure 9:

In step 632, the remote server 502 can detect that the subscriber is requesting a viewing of the contents of the coupon locker 504 from the STB 520 or a portable device such as the computing device 512 or mobile device 516. FIG. 9, for example, illustrates how a user can view in step 634 coupons in the coupon locker 504—see reference 902.

Figure 10:

In step 636, the remote server 502 can be adapted to detect a redemption request from the subscriber. The redemption request can represent a selection by the subscriber of a coupon from the coupon locker 504 (by way of, for example, the mobile 516), which the user indicates by one or more GUI menu options that the subscriber desires to redeem immediately or at a later time. In step 638, the remote server 502 can associate a redemption identifier with the requested coupon. The remote server 502 can generate unique redemption identifiers which the remote server 502 can supply, if requested, to a merchant associated with the advertisement system 510 to track coupons. The redemption identifier can if desired include an encrypted code which can be used by a retailer to safely redeem the coupon at a POS terminal 506. The encryption code can help reduce the risk of counterfeit coupons. The coupon can also be associated with a two-dimensional (2D) graphical symbol representative of the redemption code—see FIGS. 9-10. Three-dimensional symbols are also contemplated by the present disclosure. In step 640, the remote server 502 can monitor the coupon associated with the redemption identifier in a list that identifies redeemable coupons.

In step 642, the remote server 502 can be adapted to detect a redemption request from a POS terminal 506 of a retailer. This step can represent, for example, a subscriber presenting the redemption identifier of the coupon such as a bar code (see see reference 904 in FIG. 9 and references 1002-1004 in FIG. 10) to a retailer by way of a display of a mobile device 516 of the subscriber (or as a printed copy). The retailer can scan the barcode with a barcode reader. The POS terminal 506 can then transmit the redemption identifier of the coupon to the remote server 502 to validate the coupon. If remote server 502 determines that the redemption identifier supplied by the POS terminal 506 is valid, then the remote server 502 can supply redemption data to the POS terminal 506 to complete the purchase transaction. The redemption data can, for example, represent an acknowledgement that the coupon is redeemable and valid.

Once the purchase transaction has been completed in step 646, the POS terminal 506 can inform the remote server 502, and the remote server 502 can deactivate the coupon in step 648 from the coupon locker 504 by tagging the coupon as redeemed and removing it from the redemption list. The remote server 502 can be adapted to keep a history of redeemed coupons which it can share with the promoters of such coupons to discern market behavior and to improve consumer targeting. For example, in step 648 the remote server 502 can be adapted to notify the advertising system 510 when coupons have been redeemed, the retailers that have redeemed the coupon, and the identity of the subscribers redeeming the coupons. Such information can improve the targeting techniques of promoters. It should be noted that releasing information to advertisers about the activities of the subscriber and retailers in relation to coupon usage may be subject to privacy agreements with the service provider of the remote server 502 and/or the advertisers managing the advertising system 510.

Method 600 provides a ubiquitous means to distribute promotional materials to multiple communication devices available to subscribers, and friends and families. Method 600, among other things, provides accessibility to promotional materials from media devices such as set-top boxes, computing devices, and mobile devices, thereby expanding the reach of merchants to promote their products and services.

Figure 11:
Figure 12:
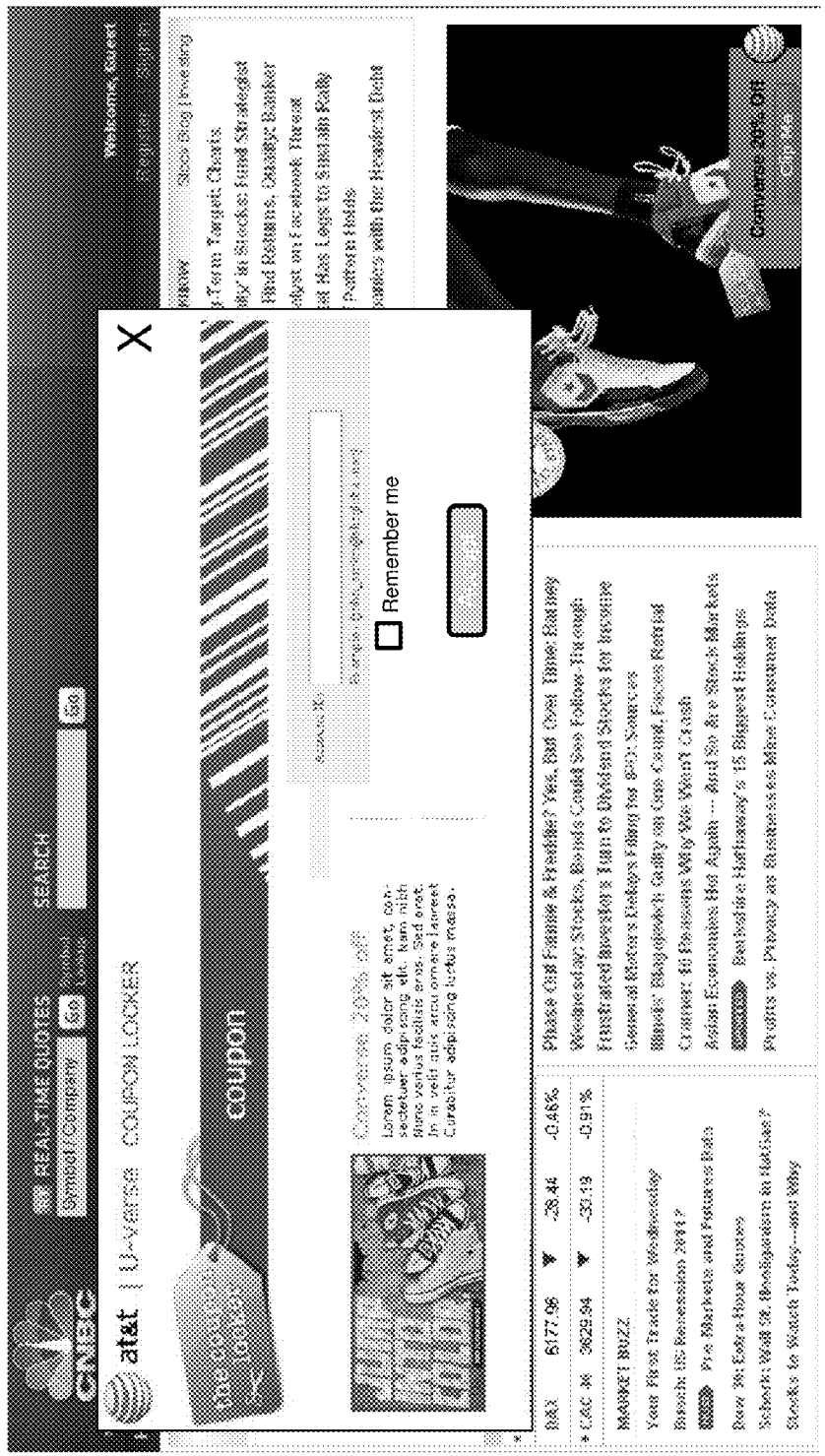

Upon reviewing the aforementioned embodiments, it would be evident to an artisan with ordinary skill in the art that said embodiments can be modified, reduced, or enhanced without departing from the scope and spirit of the claims described below. For example, method 600 can be adapted to use separate coupon lockers for pending and expired coupons. Method 600 can also be adapted so that coupons from other sources (e.g., public web pages—see FIGS. 11-12) can be stored in the coupon locker 504 of a subscriber so long as the remote server 502 recognizes the coupon and the sponsor of the coupon has an arrangement with the service provider of the remote server 502. Method 600 can be further adapted to launch a navigation application from the mobile device 516 of the subscriber to assist the subscriber in locating a retailer of a redeemable coupon selected by the subscriber from the mobile device 516.

Method 600 can also be adapted to allow promoters of the coupons to view the status of coupons that have not yet been redeemed versus coupons that have been redeemed by subscribers. Method 600 can also be adapted to allow promoters to directly target subscribers who have had a history of high consumption of coupons with new coupons. Promoters can, for example, provide criteria for contacting subscribers with a history of high consumption of coupons, or who have coupons that have expired. Method 600 can also be adapted to provide the advertising system 510 location data of subscribers who have enabled location-based services to enhance the targeting process.

Method 600 can be further adapted to detect a redemption request for a particular coupon from a friend or family member of the subscriber, and place the requested coupon in a redemption list of the requesting party, or tag the redeemable coupon with a single use tag identifying the requesting party. By isolating the redeemable coupon in a separate redemption list or by tagging the redeemable coupon with a single use tag, the redeemable coupon can be made available only to the requesting party, and no longer the subscriber or other parties that would have previously shared access to the coupon.

Figure 13:

Method 600 can also be adapted to present mapping information for coupons stored in the subscriber's coupon locker 504—see FIG. 13. Method 600 can also be adapted to allow subscribers to associate a coupon locker 504 with social networks such as Facebook™. In this embodiment, the remote server 502 can enable subscribers to establish sharing attributes in the coupon locker 504 from within the social network in order to share coupons with members of the subscriber's social network.

In yet another embodiment, promotional tags submitted with a media program can be supplied by a party other than the original author of the media program. Hence the distributor of the media program, such as the service provider of systems 100 or 200, can direct when and which media programs will present promotional offers as described by method 600.

In another embodiment, method 600 can be adapted so that the remote server 502 (or another network element of communication systems 100-200) inserts the promotional tag (e.g., coupon tags) in the TV program stream. In this embodiment, the insertion point can be determined from a context of what's being presented in the TV program stream. For example, suppose that a camera commercial is detected by the remote server 502. The remote server 502 can insert a promotional tag such as a coupon tag for picture development at a pharmacy store. In yet another embodiment, method 600 can be adapted so that media content is preprocessed with promotional tag insertions before it is streamed to media devices such as STB 520.

In another embodiment, method 600 can be adapted so that promoters of coupons can direct the service provider of the remote server 502 to select coupons according to certain selection criteria. Promoters can, for example, identify selection criteria based on a location of a party requesting the promotional information. For example, coupons can be selected according to a zip code provided by the STB 520. Selection criteria can also be based on a history of the requesting party purchasing a product from the promoter. For instance, in the case where a subscriber has previously purchased a product from the promoter (e.g., retailer), but it has been six months since the subscriber has purchased goods from the promoter, the promoter can establish selection criteria for selecting coupons of a higher value to influence the subscriber to reengage in purchasing products from the promoter.

Selection criteria can also be based on a determination that the subscriber has received the coupon on a prior occasion and thus additional requests will be rejected (no more than one coupon per person). Selection criteria can be further based on a determination that the requesting party has exceeded a threshold of copies or uses of the coupon. For instance, the promoter can choose to allow more than one coupon per subscriber so long as the subscriber does not exceed a certain limit of coupon copies. The promoter can also choose to allow the same coupon to be redeemed more than once so long as the subscriber does not exceed a threshold of reuses.

Other embodiments are contemplated by the present disclosure.

Figure 14:
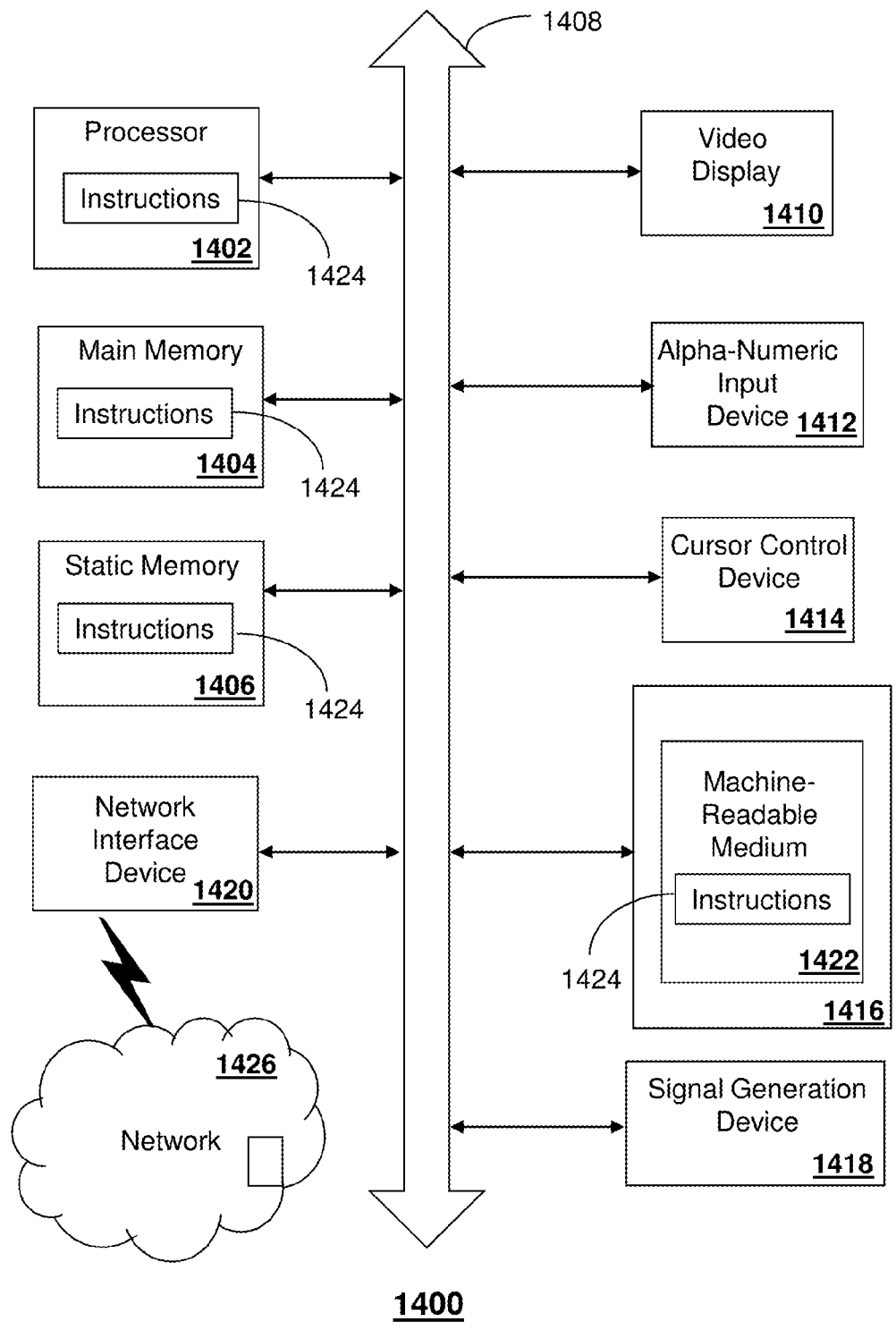
FIG. 14 is a diagrammatic representation of a machine in the form of a computer system within which a set of instructions, when executed, may cause the machine to perform any one or more of the methods discussed herein.

FIG. 14 depicts an exemplary diagrammatic representation of a machine in the form of a computer system 1400 within which a set of instructions, when executed, may cause the machine to perform any one or more of the methods discussed above. One or more instances of the machine can operate, for example, in the remote server 502, the advertising system 510, the computing devices 512, the mobile devices 516, and other devices of FIGS. 1-5. In some embodiments, the machine may be connected (e.g., using a network) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 1400 may include a processor 1402 (e.g., a central processing unit (CPU), a graphics processing unit (GPU, or both), a main memory 1404 and a static memory 1406, which communicate with each other via a bus 1408. The computer system 1400 may further include a video display unit 1410 (e.g., a liquid crystal display (LCD), a flat panel, or a solid state display. The computer system 1400 may include an input device 1412 (e.g., a keyboard), a cursor control device 1414 (e.g., a mouse), a disk drive unit 1416, a signal generation device 1418 (e.g., a speaker or remote control) and a network interface device 1420.

The disk drive unit 1416 may include a tangible computer-readable storage medium 1422 on which is stored one or more sets of instructions (e.g., software 1424) embodying any one or more of the methods or functions described herein, including those methods illustrated above. The instructions 1424 may also reside, completely or at least partially, within the main memory 1404, the static memory 1406, and/or within the processor 1402 during execution thereof by the computer system 1400. The main memory 1404 and the processor 1402 also may constitute tangible computer-readable storage media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations including, but not limited to, distributed processing or component/object distributed processing, parallel processing, or virtual machine processing can also be constructed to implement the methods described herein.

While the tangible computer-readable storage medium 1422 is shown in an example embodiment to be a single medium, the term "tangible computer-readable storage medium" should be taken to include a single medium or multiple media (e.g., a centralized or distributed database, and/or associated caches and servers) that store one or more sets of instructions. The term "tangible computer-readable storage medium" shall also be taken to include any non-transitory medium that is capable of storing or encoding a set of instructions for execution by the machine and that cause the machine to perform any one or more of the methods of the present disclosure.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth, WiFi, Zigbee), and long-range communications (e.g., WiMAX, GSM, CDMA, LTE) are contemplated for use by computer system 1400.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising:
   receiving, by a set-top box comprising a processor, a television program stream;
   presenting, by the set-top box, the television program stream;
   detecting, by the set-top box, a coupon tag in the television program stream;
   retrieving, by the set-top box, the coupon tag from the television program stream;
   transmitting, by the set-top box, to a remote server a request for coupon information, the request comprising at least a portion of the coupon tag, an identifier of the set-top box, and descriptive information about the television program stream, wherein the coupon information received from the remote server comprises one of a first coupon and a second coupon, wherein the remote server selects the first coupon responsive to determining from a scheduled presentation date of the television program stream and an approximate time when the request was received by the remote server that the television program stream is consistent with the scheduled presentation date, and wherein the remote server selects the second coupon responsive to determining from the scheduled presentation date of the television program stream and the approximate time when the request was received by the remote server that the television program stream is being presented from a recording thereof;
   receiving, by the set-top box, coupon information associated with a coupon without receiving the coupon itself responsive to a determination that a coupon offer is available at approximately a time when the request was transmitted;
   presenting, by the set-top box, the coupon information contemporaneously with at least a portion of the television program stream; and
   transmitting, by the set-top box, to the remote server a coupon request initiated by a remote controller of the set-top box, wherein the coupon request is transmitted responsive to the remote controller initiating the coupon request within a predetermined time, and wherein transmitting the coupon request causes the remote server to store the coupon at a remote database associated with a user of the set-top box.

2. The method of claim 1, comprising removing the presentation of the coupon information responsive to not initiating the coupon request within the predetermined time.

3. The method of claim 1, comprising:
   receiving from the remote server an acknowledgment that the coupon was stored at the remote database; and
   replacing the presentation of the coupon information with the acknowledgment that the coupon has been stored at the remote database and is accessible for redemption.

4. The method of claim 1, wherein the descriptive information about the television program stream comprises a television program identifier, and wherein the remote server is operable to determine a scheduled presentation date of the television program stream according to the television program identifier.

5. The method of claim 1, wherein the remote server is operable to determine a consumption identifier from one of a consumption behavior of coupons, demographic information of a subscriber of media services, psychographic information of the subscriber, or a location of the subscriber, and wherein the remote server is operable to select the coupon according to the consumption identifier.

6. The method of claim 1, comprising receiving the television program stream from one of an Internet protocol television network, a cable television system, or a satellite television system.

7. A method, comprising:
   receiving, by a system comprising a processor, a first request for coupon information responsive to a media processor detecting a coupon tag received with a media program stream;
   transmitting, by the system, to the media processor coupon information associated with a coupon, without transmitting the coupon itself, responsive to a determination that a coupon offer is available at approximately a time when the first request is received;
   receiving, by the system, from the media processor a second request to acquire the coupon responsive to an action generated by an input device of the media processor;
   storing, by the system, the coupon in a database associated with a user of the media processor responsive to receiving the second request for the coupon, wherein the coupon is one of a first coupon and a second coupon;
   selecting, by the system, the first coupon responsive to determining from a scheduled presentation date of the media program and an approximate time when the second request was received that the presentation of the media program is consistent with the scheduled presentation date; and
   selecting, by the system, the second coupon responsive to determining from the scheduled presentation date and the approximate time when the second request was received that the media program is being presented from a recording of the media program.

8. The method of claim 7, wherein the coupon tag is received by the media processor as closed caption data delivered with the media program stream.

9. The method of claim 8, wherein the first request comprises descriptive information about the media program stream in a form of a media program identifier.

10. The method of claim 7, comprising:
    determining that no coupon offers are available at approximately the time the action is received; and
    transmitting to the media processor an indication that there is no coupon offers responsive to the determination.

11. The method of claim 7, comprising:
    associating a consumption identifier with the user of the media processor to identify a consumption profile of the user;
    retrieving the consumption identifier responsive to receiving the first request;
    selecting the coupon according to the consumption identifier; and
    transmitting to the media processor the coupon information associated with the selected coupon.

12. The method of claim 11, wherein the consumption identifier comprises a combination of identifiers, each identifier representative of a descriptive attribute of the user of the media processor.

13. The method of claim 7, comprising:
    receiving from a communication device a third request to redeem the coupon stored in the database;
    associating the coupon with a redemption identifier;
    transmitting to the communication device a representation of the redemption identifier;
    receiving from a point of sale terminal a fourth request to redeem the coupon, wherein the fourth request comprises at least the redemption identifier of the coupon;

transmitting to the point of sale terminal information associated with the coupon to complete a purchase transaction;

receiving from the point of sale terminal an indication that the purchase transaction has been completed; and deactivate the coupon responsive to the received indication.

14. The method of claim 7, comprising:

transmitting to a communication device descriptive information associated with the coupon stored in the database, wherein the communication device is operable to:

determining a location of the communication device according to location coordinates; and presenting the coupon in the database according to the location of the communication device.

15. The method of claim 7, comprising receiving an attribute to establish one of sharing the coupon with another user other than the user of the media processor, transferring the coupon to an account of one of the other user, or reserving the coupon for exclusive use by the user of the media processor.

16. A server, comprising:

a memory to store instructions; and a processor coupled to the memory; wherein responsive to executing the instructions, processor performs operations comprising:

receiving a request for promotional information responsive to a media processor detecting a promotional tag in a media program stream;

transmitting to the media processor promotional information associated with a promotion item responsive to a determination that a promotional offer is available;

receiving from the media processor a request for redeemable material associated with the promotion item;

storing the redeemable material in a portion of a database associated with a user of the media processor, wherein the redeemable material is a coupon, and wherein the coupon is one of a first coupon and a second coupon;

selecting the first coupon responsive to determining that the media program stream is being presented by the media processor during a program presentation schedule; and selecting the second coupon responsive to determining that the media program stream is being presented by the media processor from a recording thereof.

17. The server of claim 16, wherein the promotion item comprises one of a gift voucher, a product voucher, a service voucher, a loyalty voucher, a travel voucher, an entertainment voucher, or a voucher for loyalty points, and wherein the media processor is one of a set-top box, a cellular telephone, or a computing device.

18. The server of claim 16, wherein the operations further comprise inserting, the promotional tag in the media program stream.

19. The server of claim 16, wherein the operations further comprise inserting the promotional tag in stored media content before the stored media content is transmitted to the media processor as the media program stream.

20. The server of claim 16, wherein the operations further comprise selecting the promotion item according to selection criteria supplied by a promoter of the promotion item.

21. The server of claim 20, wherein the selection criteria is based on one of a location of a party requesting the promotional information, a history of the requesting party purchasing a product from the promoter, a determination that the requesting party has received the promotion item on a prior occasion, a determination that the requesting party has received other promotion items on a prior occasion, a determination that other promotion items now in the possession of the requesting party have been given a high or low priority by the requesting party, or a determination that the requesting party has exceeded a threshold of copies or uses of the promotion item.

* * * * *